United States Patent
Lee et al.

(10) Patent No.: US 9,685,271 B2
(45) Date of Patent: Jun. 20, 2017

(54) MULTILAYER CERAMIC ELECTRONIC COMPONENT AND BOARD HAVING THE SAME

(71) Applicant: SAMSUNG ELECTRO-MECHANICS CO., LTD., Suwon-Si, Gyeonggi-Do (KR)

(72) Inventors: Sun Cheol Lee, Suwon-Si (KR); Hyoung Wook Lim, Suwon-Si (KR); Mi Ok Park, Suwon-Si (KR); Jae Yeol Choi, Suwon-Si (KR); Ji Hee Moon, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 41 days.

(21) Appl. No.: 14/663,412

(22) Filed: Mar. 19, 2015

(65) Prior Publication Data
US 2016/0099105 A1    Apr. 7, 2016

(30) Foreign Application Priority Data
Oct. 6, 2014  (KR) .................. 10-2014-0134273

(51) Int. Cl.
*H01G 4/30*    (2006.01)
*H01G 4/005*   (2006.01)
(Continued)

(52) U.S. Cl.
CPC .............. *H01G 4/30* (2013.01); *H01G 2/065* (2013.01); *H01G 4/012* (2013.01); *H01G 4/232* (2013.01); *H01G 4/1227* (2013.01)

(58) Field of Classification Search
CPC ....................................... H01G 4/30
(Continued)

(56) References Cited

U.S. PATENT DOCUMENTS

| 4,568,999 A * | 2/1986 | Larowe ........... | H01G 2/06 361/306.3 |
| 7,394,646 B2 * | 7/2008 | Tonogai ........... | H01G 4/30 361/303 |

(Continued)

FOREIGN PATENT DOCUMENTS

| JP | 2002015940 A * | 1/2002 |
| JP | 2002075780 A * | 3/2002 |

(Continued)

OTHER PUBLICATIONS

Notice of Office Action issued in corresponding Korean Patent Application No. 10-2014-0134273, mailed on Jan. 18, 2016; with English translation.

*Primary Examiner* — Eric Thomas
(74) *Attorney, Agent, or Firm* — McDermott Will & Emery LLP (57) ABSTRACT

A multilayer ceramic electronic component includes: a ceramic body including dielectric layers; an active part including first and second internal electrodes which are exposed to both end surfaces of the ceramic body in a length direction thereof, and floating electrodes which are partially overlapped with the first and second internal electrodes; upper and lower cover parts including the dielectric layers and disposed above and below the active part; dummy electrodes disposed in the upper and lower cover parts to be overlapped with the floating electrodes; and first and second external electrodes.

14 Claims, 4 Drawing Sheets

(51) Int. Cl.
*H01G 2/06* (2006.01)
*H01G 4/012* (2006.01)
*H01G 4/232* (2006.01)
*H01G 4/12* (2006.01)

(58) Field of Classification Search
USPC .............................................. 361/301.4, 303
See application file for complete search history.

(56) References Cited

U.S. PATENT DOCUMENTS

| 8,531,817 B2 * | 9/2013 | Yoshida ............... H01C 1/1406 |
| | | 361/303 |
| 2007/0025054 A1 * | 2/2007 | Tonogai ................... H01G 4/30 |
| | | 361/303 |
| 2008/0080121 A1 | 4/2008 | Togashi |
| 2010/0220426 A1 | 9/2010 | Shimizu |
| 2013/0027843 A1 | 1/2013 | Seo et al. |
| 2013/0342081 A1 * | 12/2013 | Kuroda .................. H01C 7/008 |
| | | 310/366 |

FOREIGN PATENT DOCUMENTS

| JP | 2005-252104 A | 9/2005 | |
| JP | 2008-091520 A | 4/2008 | |
| JP | 2009-071106 A | 4/2009 | |
| JP | WO 2009093375 A1 * | 7/2009 | ............ H01G 4/008 |
| JP | 2013-093374 A | 5/2013 | |
| KR | 10-2013-0012716 A | 2/2013 | |
| WO | 2009/066507 A1 | 5/2009 | |

* cited by examiner

MULTILAYER CERAMIC ELECTRONIC COMPONENT AND BOARD HAVING THE SAME

CROSS-REFERENCE TO RELATED APPLICATION

This application claims the priority and benefit of Korean Patent Application No. 10-2014-0134273 filed on Oct. 6, 2014, with the Korean Intellectual Property Office, the disclosure of which is incorporated herein by reference.

BACKGROUND

The present disclosure relates to a multilayer ceramic electronic component (MLCC) and a board having the same.

Electronic components including ceramic materials include capacitors, inductors, piezoelectric elements, varistors, thermistors, and the like.

Among such ceramic electronic components, a multilayer ceramic capacitor (MLCC) has advantages such as a relatively small size, high capacitance, and ease of mounting.

Multilayer ceramic capacitors are chip shaped condensers mounted on printed circuit boards of various electronic products, such as display devices like liquid crystal displays (LCDs) and plasma display panels (PDP), computers, personal digital assistants (PDAs), mobile phones, and the like, serving to allow electricity to be charged therein or discharged therefrom.

The multilayer ceramic capacitor may include a plurality of stacked dielectric layers, internal electrodes having different polarities disposed to face each other with each of the dielectric layers interposed therebetween, and external electrodes electrically connected to the internal electrodes.

Generally, in a case of a high capacitance multilayer ceramic capacitor, a capacitance value may be adjusted by increasing or decreasing the number of stacked internal electrodes, but in a case of a low capacitance multilayer ceramic capacitor, a capacitance value may be lowered by increasing a thickness of each dielectric layer.

In this case, the internal electrodes and the external electrodes should be stably electrically connected to each other, and the multilayer ceramic capacitor should have sufficient bending strength in order to withstand stress generated when manufactured or mounted on a board.

RELATED ART DOCUMENT (Patent Document 1) Japanese Patent Laid-Open Publication No. 2009-71106

SUMMARY

An exemplary embodiment in the present disclosure may provide a multilayer ceramic electronic component having high bending strength capable of preventing the occurrence of cracks and delamination, and a board having the same.

According to an aspect of the present disclosure, a multilayer ceramic electronic component may include: first and second internal electrodes which are disposed to be exposed to both end surfaces of the ceramic body in a length direction of the ceramic body; floating electrodes of which both end portions are spaced apart from and overlapped with the first and second internal electrodes in a thickness direction of the ceramic body; and dummy electrodes which are disposed in upper and lower cover parts.

According to another aspect of the present disclosure, a board having a multilayer ceramic electronic component may include: a printed circuit board; first and second board electrodes disposed on one surface of the printed circuit board; and a multilayer ceramic electronic component mounted on the printed circuit board and electrically connected to the first and second board electrodes, wherein the multilayer ceramic electronic component includes first and second internal electrodes which are disposed to be exposed to both end surfaces of the ceramic body in a length direction of the ceramic body, floating electrodes of which both end portions are spaced apart from and overlapped with the first and second internal electrodes in a thickness direction of the ceramic body, and dummy electrodes which are disposed in upper and lower cover parts.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

With regard to defining directions in the present disclosure, L, W, and T shown in the drawings refer to a length direction, a width direction, and a thickness direction, respectively.

Multilayer Ceramic Electronic Component

Figure 1:
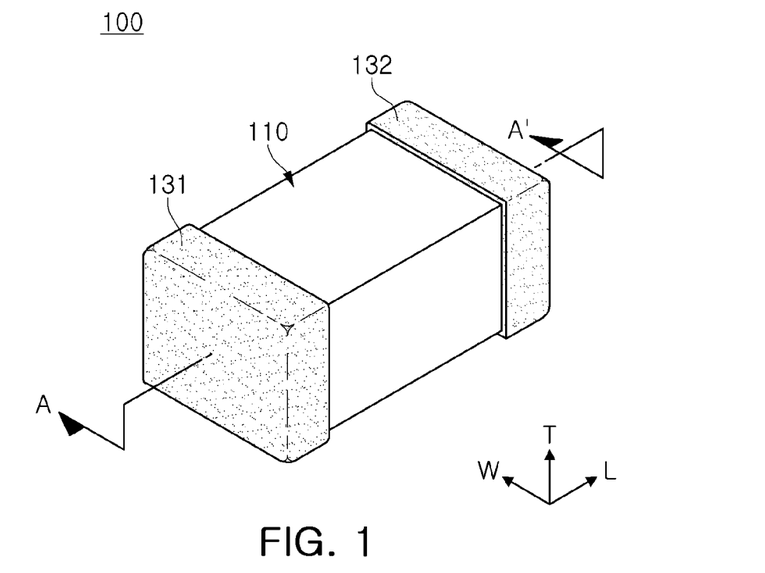
FIG. 1 is a perspective view of a multilayer ceramic electronic component according to an exemplary embodiment in the present disclosure.
Figure 2:
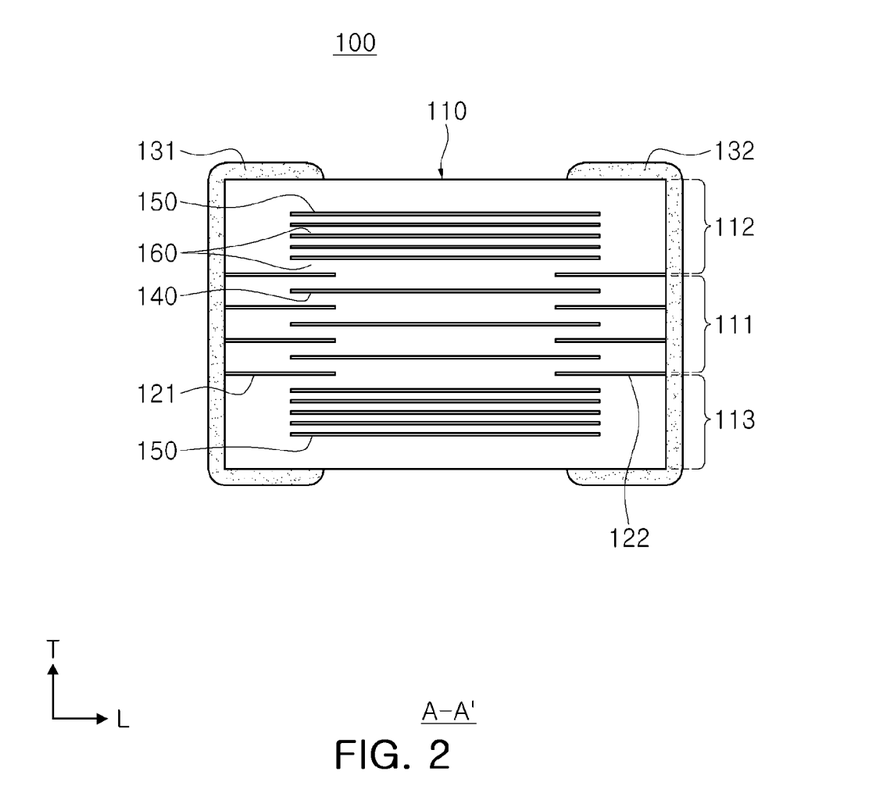
FIGS. 2 and 3 are cross-sectional views of the multilayer ceramic electronic component, taken along line A-A' of FIG. 1.
Figure 3:
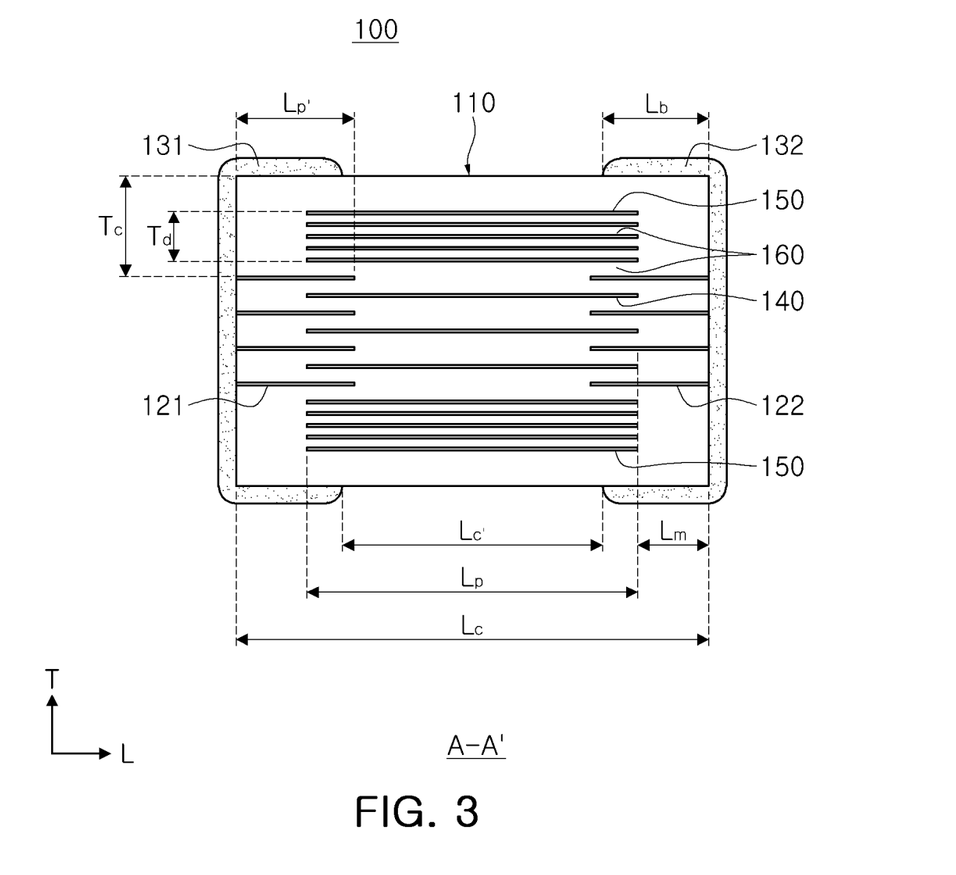

FIG. 1 is a perspective view of a multilayer ceramic electronic component according to an exemplary embodiment in the present disclosure, and FIGS. 2 and 3 are cross-sectional views of the multilayer ceramic electronic component 100, taken along line A-A' of FIG. 1.

Referring to FIGS. 1 through 3, a multilayer ceramic electronic component 100 according to an exemplary embodiment may include: a ceramic body 110 including dielectric layers 160; an active part 111 including first and second internal electrodes 121 and 122 disposed to be exposed to both end surfaces of the ceramic body 110 in a length direction of the ceramic body 110 with at least one of the dielectric layers interposed therebetween, and floating electrodes 140 alternating with the first and second internal electrodes 121 and 122 in a thickness direction of the ceramic body 110 while allowing both end portions thereof to be spaced apart from and overlapped with the first and second internal electrodes 121 and 122 in the thickness direction of the ceramic body 110; upper and lower cover parts 112 and 113 disposed on and below the active part 111; dummy electrodes 150 disposed between the dielectric layers 160 within the upper and lower cover parts 112 and 113; and first and second external electrodes 131 and 132 provided on both end surfaces of the ceramic body 110 in the length direction thereof and electrically connected to the first and second internal electrodes 121 and 122, respectively. An area of the floating electrode 140 on the dielectric layer 160 may be equal to an area of the dummy electrode 150 on the dielectric layer 160.

When functionally divided into parts with reference to FIG. 2, the multilayer ceramic electronic component 100 may include: the active part 111 in which the first and second internal electrodes 121 and 122, the floating electrodes 140, and the dielectric layers 160 are alternately stacked; and the upper and lower cover parts 112 and 113 in which the dielectric layers 160 and the dummy electrodes 150 are stacked on and below the active part 111. In the active part 111, as current flows in the first and second internal electrodes 121 and 122, capacitance may be formed by the first and second internal electrodes 121 and 122 and the floating electrodes 140.

The ceramic body 110 may be formed by stacking a plurality of dielectric layers 160 in the thickness direction of the ceramic body 110 and then sintering the stacked dielectric layers, and adjacent dielectric layers 160 may be integrated such that boundaries therebetween are not readily apparent. Here, the ceramic body 110 may have a hexahedral shape.

The dielectric layers 160 may contain a ceramic material having high permittivity, such as barium titanate ($BaTiO_3$) based ceramic powder, but the material thereof is not limited thereto as long as sufficient capacitance may be obtained.

In addition, the dielectric layers 160 may further contain various ceramic additives such as transition metal oxides or carbides, a rare earth element, magnesium (Mg), and aluminum (Al), an organic solvent, a plasticizer, a binder, a dispersant, and the like, in addition to the ceramic powder, as needed.

The upper and lower cover parts 112 and 113 may be formed by sintering a plurality of ceramic sheets similarly to the dielectric layers 160 having the first and second internal electrodes 121 and 122 formed thereon, and may have a similar structure to that of dielectric layers 160 positioned in a central portion of the ceramic body 110.

The first and second external electrodes 131 and 132 may be formed on both end surfaces of the ceramic body 110 in the length direction thereof to cover the plurality of first and second internal electrodes 121 and 122 exposed to both end surfaces, thereby being electrically connected to the first and second internal electrodes 121 and 122, respectively.

The first and second external electrodes 131 and 132 may be formed of a conductive metal, for example, at least one of silver (Ag), lead (Pb), platinum (Pt), nickel (Ni), copper (Cu), and alloys thereof, but the material thereof is not limited thereto.

Meanwhile, first and second plating layers (not shown) may be formed on the first and second external electrodes 131 and 132, as needed.

The first and second plating layers may include nickel (Ni) plating layers formed on the first and second external electrodes 131 and 132 and tin (Sn) plating layers formed on the nickel plating layers.

Figure 5:
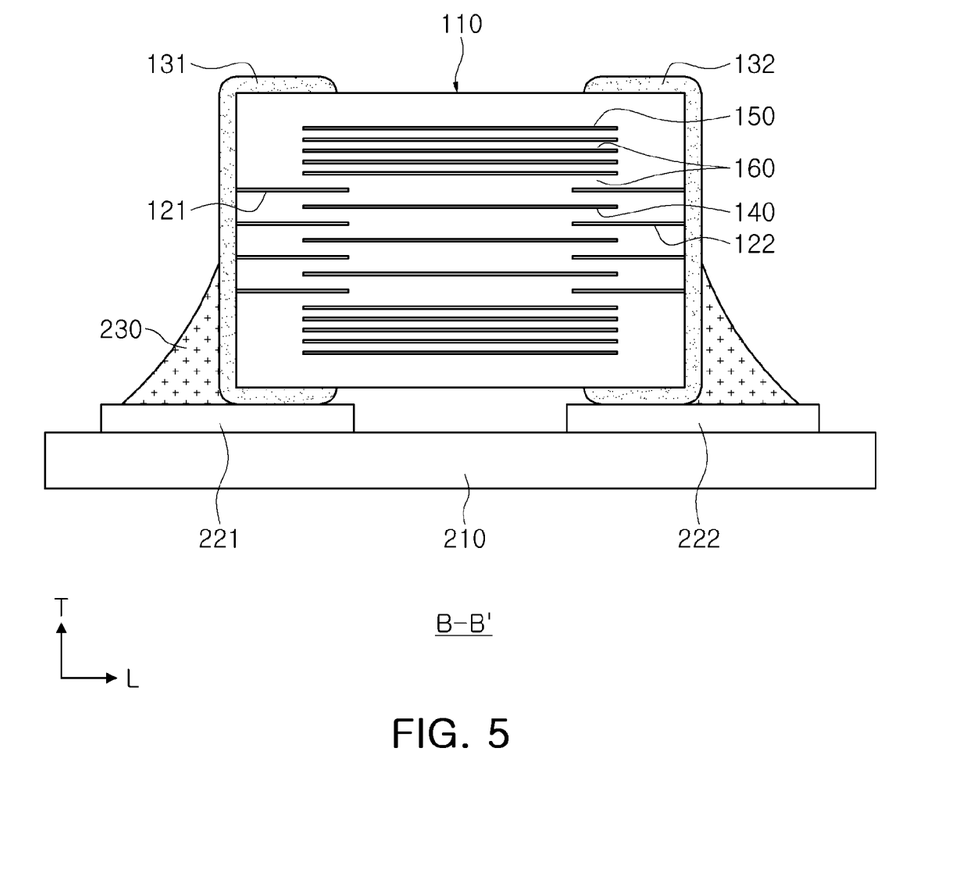
FIG. 5 is a cross-sectional view of the board having a multilayer ceramic electronic component, taken along line B-B' of FIG. 4.

The first and second plating layers are provided to increase adhesion strength between the multilayer ceramic electronic component 100 and a printed circuit board 210 at the time of mounting the multilayer ceramic electronic component 100 on the printed circuit board 210, or the like, by solders 230. The plating treatment may be performed by a method known in the art, and lead-free plating may be preferable in consideration of eco-friendly factors. However, the present inventive concept is not limited thereto.

The first and second internal electrodes 121 and 122, having different polarities, may be formed on the ceramic sheets forming the dielectric layers 160 to be spaced apart from each other, and may be formed in the ceramic body 110 while being exposed to both end surfaces of the ceramic body 110 in the length direction thereof, respectively.

As described above, end portions of the first and second internal electrodes 121 and 122 exposed to both end surfaces of the ceramic body 110 in the length direction thereof may be electrically connected to the first and second external electrodes 131 and 132, respectively.

In addition, the first and second internal electrodes 121 and 122 may be formed of a conductive metal, for example, at least one of silver (Ag), lead (Pb), platinum (Pt), nickel (Ni), copper (Cu), and alloys thereof, but the material thereof is not limited thereto.

Generally, in a case of a high capacitance multilayer ceramic capacitor, a capacitance value may be adjusted by increasing or decreasing the number of stacked internal electrodes, but in a case of a low capacitance multilayer ceramic capacitor, a capacitance value may be decreased by increasing a thickness of each dielectric layer 160. Since a reduced number of dielectric layers and internal electrodes are stacked in an active part of the low capacitance multilayer ceramic capacitor, it is difficult to secure sufficient bending strength, and thus, cracks, delamination, or the like, may occur during a manufacturing process.

According to the exemplary embodiment, the floating electrodes 140 and the dummy electrodes 150 may be included to improve bending strength of the ceramic body 110.

The floating electrodes 140 may alternate with the first and second internal electrodes 121 and 122 in the active part 111 of the ceramic body 110 in the thickness direction thereof, and both end portions thereof may be partially overlapped with end portions of the first and second internal electrodes 121 and 122 spaced apart from each other, respectively.

The floating electrodes 140 may be formed within the ceramic body 110 so as to not be exposed to the outer surfaces of the ceramic body 110 and may be electrically separated from the first and second external electrodes 131 and 132.

A width of the floating electrode 140 may be equal to that of the first and second internal electrodes 121 and 122, but the present inventive concept is not limited thereto.

Capacitance of the ceramic electronic component may be adjusted by adjusting the numbers and shapes of the floating electrodes 140 and the first and second internal electrodes 121 and 122. Therefore, the shapes and numbers of the floating electrodes 140 and the first and second internal electrodes 121 and 122 and areas of overlapped regions therebetween may be changed in order to adjust capacitance, and are not limited to those illustrated in the exemplary embodiment of FIGS. 1 through 3.

In addition, the floating electrodes 140 may be formed of a conductive metal, for example, at least one of silver (Ag), lead (Pb), platinum (Pt), nickel (Ni), copper (Cu), and alloys thereof, but the material thereof is not limited thereto.

The dummy electrodes 150 may be stacked in the upper and lower cover parts 112 and 113 of the ceramic body 110 in the thickness direction thereof, with at least one of the dielectric layers interposed therebetween.

The dummy electrodes 150 may be formed in the ceramic body 110 so as to not be exposed to the outer surfaces of the ceramic body 110 and may be electrically separated from the first and second external electrodes 131 and 132.

The dummy electrodes 150 may serve to significantly reduce a step between the central portion of the ceramic body 110 and both end portions of the ceramic body 110 on the basis of a cross section of the ceramic body 110 in a length-thickness direction of the ceramic body 110. Therefore, the dummy electrode 150 and the floating electrode 140 may have the same shape. On the cross section of the ceramic body 110 in the length-thickness direction thereof, the floating electrode 140 and the dummy electrode 150 may have the same length and width. In addition, the dummy electrode 150 may be formed to be overlapped with the floating electrode 140, and the area of the floating electrode 140 on the dielectric layer 160 may be equal to the area of the dummy electrode 150 on the dielectric layer 160.

Referring to FIGS. 1 through 3, band portions of the first and second external electrodes 131 and 132 may be extended onto upper and lower surfaces of the ceramic body 110. Since the band portions of the first and second external electrode 131 and 132 are formed to be electrically separated from each other on the upper and lower surfaces of the ceramic body 110, the band portions of the first and second external electrodes 131 and 132 may be formed to be spaced apart from each other by a predetermined distance.

When a distance between inner edges of the band portions of the first and second external electrodes 131 and 132 on the upper or lower surface of the ceramic body 110 is defined as Lc' and a length of the dummy electrode 150 in the length direction of the ceramic body 110 is defined as Lp, the multilayer ceramic electronic component 100 according to the exemplary embodiment may satisfy Lc'<Lp. When the length Lp of the dummy electrode 150 is greater than the distance Lc' between the inner edges of the band portions of the first and second external electrodes 131 and 132, the step between the central portion of the ceramic body 110 and both end portions of the ceramic body 110 may be sufficiently reduced, whereby bending strength may be increased.

When the length Lp of the dummy electrode 150 is less than 1.1 times the distance Lc' between the inner edges of the band portions of the first and second external electrodes 131 and 132, the dummy electrode 150 may not sufficiently support the ceramic body 110, whereby the bending strength may be decreased, resulting in cracks or delamination. When the length Lp of the dummy electrode 150 is equal to or greater than 0.95 times a length Lc of the ceramic body 110, the dummy electrode 150 may support most of the ceramic body 110, whereby the effect of reducing the step may be decreased, and the dummy electrode 150 may be connected to the first and second external electrodes 131 and 132, and thus, desired capacitance may not be obtained. Therefore, sufficient bending strength may be obtained in a case in which the length Lp of the dummy electrode 150 satisfies 1.1×Lc'≤Lp<0.95×Lc.

When a distance between the floating electrode 140 and one end surface of the ceramic body in the length direction of the ceramic body 110 is defined as Lm and a distance from an inner edge of one band portion of the first and second external electrodes 131 and 132 extended onto the upper or lower surface of the ceramic body 110 to one end surface of the ceramic body 110, that is, a length of one band portion of the first and second external electrodes 131 and 132 in the length direction of the ceramic body 110, is defined as Lb, the multilayer ceramic electronic component 100 according to the exemplary embodiment may satisfy Lm<Lb.

Since the dummy electrode 150 is formed within the ceramic body 110 so as to not come in contact with the first and second external electrodes 131 and 132, the dummy electrode 150 may be spaced apart from both end surfaces of the ceramic body 110 in the length direction thereof by a predetermined distance. In this case, the distance between the floating electrode 140 and the end surface of the ceramic body may be defined as Lm. The band portions of the first and second external electrodes 131 and 132 may be extended onto the upper and lower surfaces of the ceramic body 110. In this case, the distance from the inner edge of one band portion of the first and second external electrodes 131 and 132 extended onto the upper or lower surface of the ceramic body 110 to one end surface of the ceramic body 110 may be defined as Lb.

When the distance Lm between the floating electrode 140 and the end surface of the ceramic body 110 is less than the distance Lb from the inner edge of the band portion of the first and second external electrodes 131 and 132 extended to the upper or lower surface of the ceramic body 110 to the end surface of the ceramic body 110, the dummy electrode 150 may sufficiently support portions of the ceramic body 110 to which the first and second external electrodes 131 and 132 are extended, whereby bending strength may be improved.

When the distance Lm between the floating electrode 140 and the end surface of the ceramic body 110 is greater than 0.95 times the distance Lb from the inner edge of one band portion of the first and second external electrodes 131 and 132 extended onto the upper or lower surface of the ceramic body 110 to the end surface of the ceramic body 110, the dummy electrode 150 may not sufficiently support the portions of the ceramic body 110 to which the first and second external electrodes 131 and 132 are extended, whereby sufficient bending strength may not be obtained, resulting in cracks or delamination. Therefore, the multilayer ceramic electronic component 100 may obtain improved bending strength by satisfying Lm≤0.95×Lb.

When the length of each of the first and second internal electrodes 121 and 122 in the length direction of the ceramic body 110 is defined as Lp' and the length of one band portion of the first and second external electrodes 131 and 132 extended onto the upper or lower surface of the ceramic body 110 in the length direction of the ceramic body 110 is defined as Lb, the multilayer ceramic electronic component 100 according to the exemplary embodiment may satisfy Lb<Lp'.

The first and second internal electrodes 121 and 122 may be spaced apart from each other while being in contact with both end surfaces of the ceramic body 110 in the length direction thereof, respectively. By allowing the length Lp' of the first and second internal electrodes 121 and 122 to be greater than the length Lb of the band portion of the first and second external electrodes 131 and 132 extended onto the upper or lower surface of the ceramic body 110, the step in the ceramic body 110 may be significantly reduced, resulting in improved bending strength. In addition, an area of an overlapped region between the first and second internal electrodes 121 and 122 and the floating electrodes 140 may be sufficiently secured, whereby it may be easy to obtain desired capacitance.

When the length Lp' of the first and second internal electrodes 121 and 122 is less than 1.1 times the length Lb of the band portion of the first and second external electrodes 131 and 132 extended onto the upper or lower surface of the ceramic body 110, the step in the ceramic body 110 may be increased, whereby sufficient bending strength may not be obtained and cracks or delamination may occur. Therefore, the multilayer ceramic electronic component 100 may obtain sufficient bending strength by satisfying 1.1×Lb≤Lp'.

The upper and lower cover parts 112 and 113 may serve as a buffer which absorbs external and internal impacts. The dummy electrodes 150 formed in the upper and lower cover parts 112 and 113 may serve to reduce the step in the ceramic body 110, thereby preventing cracks or delamination. Therefore, a sufficient number of dummy electrodes 150 need to be formed.

When a distance between the lowermost dummy electrode and the uppermost dummy electrode among the dummy electrodes 150 (corresponding to a thickness of a dummy electrode part) formed in the upper cover part 112 is defined as Td and a thickness of the upper cover part 112 is defined as Tc, the multilayer ceramic electronic component 100 according to the exemplary embodiment may satisfy 0.1×Tc≤Td≤0.99×Tc. Similarly, when a distance between the lowermost dummy electrode and the uppermost dummy electrode among the dummy electrodes 150 (corresponding to a thickness of a dummy electrode part) formed in the lower cover part 113 is defined as Td and a thickness of the lower cover part 113 is defined as Tc, the multilayer ceramic electronic component 113 according to the exemplary embodiment may satisfy 0.1×Tc≤Td≤0.99×Tc.

When the thickness Td of the dummy electrode part is less than 0.1 times the thickness Tc of the upper or lower cover part 112 or 113, the number of dummy electrodes 150 stacked in the dummy electrode part is excessively small, whereby the step in the ceramic body 110 may not be sufficiently reduced, resulting in decreased bending strength. When the thickness Td of the dummy electrode part is greater than 0.99 times the thickness Tc of the upper or lower cover part 112 or 113, the dummy electrodes 150 may come in contact with the first and second external electrodes 131 and 132 extended to the upper and lower surfaces of the ceramic body 110. Therefore, the multilayer ceramic electronic component 100 may obtain sufficient bending strength by satisfying 0.1×Tc≤Td≤0.99×Tc.

In a case in which the dummy electrodes 150 are excessively stacked or the dielectric layer 160 disposed between the dummy electrodes 150 is significantly thick, the size of the chip may be excessively increased.

Therefore, the thickness of the dielectric layer 160 disposed between the dummy electrodes 150 needs to be minimized in a range which is enough to suppress the step. According to the exemplary embodiment, the dielectric layer 160 disposed between the dummy electrodes 150 may be formed to have a thickness of about 10% to 20% of the thickness of the dielectric layer 160 disposed between the first and second internal electrodes 121 and 122. More specifically, the dielectric layer 160 disposed between the dummy electrodes 150 may have a thickness of 5 µm, and the dielectric layer 160 disposed between the first and second internal electrodes 121 and 122 may have a thickness of 30 µm.

Board Having Multilayer Ceramic Electronic Component

Figure 4:
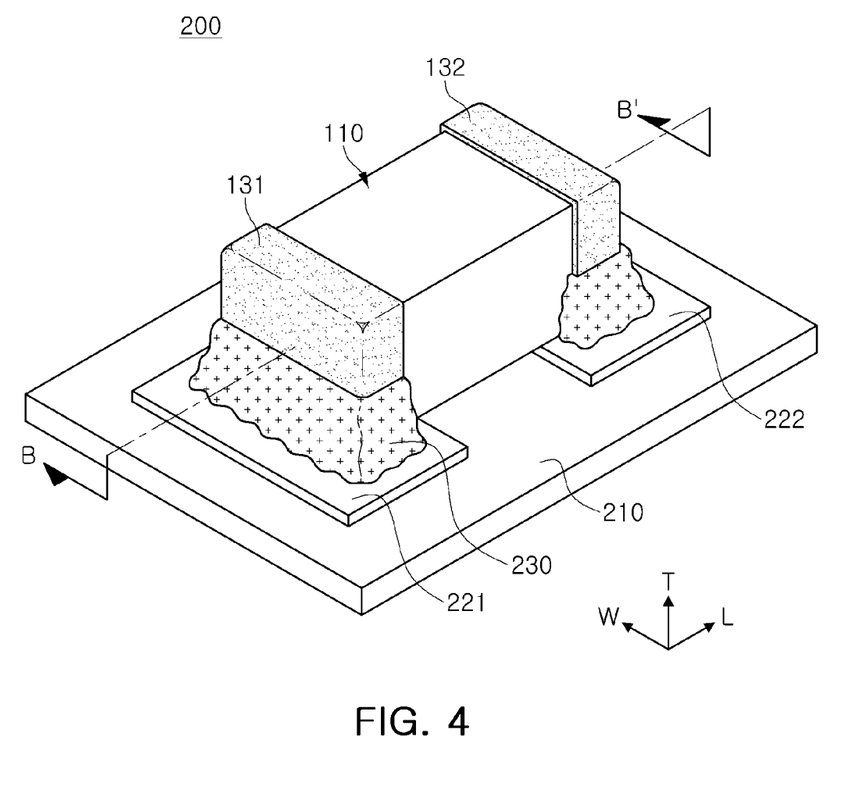
FIG. 4 is a perspective view of a board having a multilayer ceramic electronic component according to an exemplary embodiment in the present disclosure.

FIG. 4 is a perspective view of a board having a multilayer ceramic electronic component according to an exemplary embodiment in the present disclosure, and FIG. 5 is a cross-sectional view of the board having a multilayer ceramic electronic component, taken along line B-B' of FIG. 4.

Referring to FIGS. 4 and 5, a board 200 having a multilayer ceramic electronic component according to an exemplary embodiment may include a printed circuit board 210, first and second board electrodes 221 and 222 disposed on one surface of the printed circuit board 210, and a multilayer ceramic electronic component 100 mounted on the printed circuit board 210 and electrically connected to the first and second board electrodes 221 and 222. The multilayer ceramic electronic component 100 may include a ceramic body 110 including dielectric layers 160; an active part 111 including first and second internal electrodes 121 and 122 disposed to be exposed to both end surfaces of the ceramic body 110 in a length direction of the ceramic body 110 with at least one of the dielectric layers 160 interposed therebetween, and floating electrodes 140 alternating with the first and second internal electrodes 121 and 122 in a thickness direction of the ceramic body 110 while allowing both end portions thereof to be spaced apart from and overlapped with the first and second internal electrodes 121 and 122 in the thickness direction of the ceramic body 110; upper and lower cover parts 112 and 113 including the dielectric layers 160 and disposed on and below the active part 111; dummy electrodes 150 disposed within the upper and lower cover parts 112 and 113 with at least one of the dielectric layers 160 interposed therebetween while being overlapped with the floating electrodes 140; and first and second external electrodes 131 and 132 formed on both end surfaces of the ceramic body 110 in the length direction of the ceramic body 110 and electrically connected to the first and second internal electrodes 121 and 122, respectively.

The multilayer ceramic electronic component 100 may be electrically connected to the printed circuit board 210 by solders 230 in a state in which the lower cover part 113 is disposed downwardly and the first and second external electrodes 131 and 132 are positioned to contact the first and second board electrodes 221 and 222, respectively.

The multilayer ceramic electronic component 100 mounted on the board 200 according to this exemplary embodiment of the present disclosure may be the same as the multilayer ceramic electronic component 100 according to the previous exemplary embodiment.

As set forth above, according to exemplary embodiments of the present disclosure, a multilayer ceramic electronic component having high bending strength and a board having the same may be provided, whereby cracks and delamination may be prevented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
   a ceramic body including dielectric layers;
   an active part including first and second internal electrodes which are exposed to both end surfaces of the ceramic body in a length direction of the ceramic body and are stacked with at least one of the dielectric layers interposed therebetween, and floating electrodes which alternate with the first and second internal electrodes in a thickness direction of the ceramic body while allowing both end portions thereof to be spaced apart from and overlapped with the first and second internal electrodes in the thickness direction;

upper and lower cover parts disposed above and below the active part;

dummy electrodes disposed between the dielectric layers within the upper and lower cover parts; and first and second external electrodes provided on both end surfaces of the ceramic body in the length direction and electrically connected to the first and second internal electrodes, respectively, wherein an area of the floating electrode on the dielectric layer is equal to an area of the dummy electrode on the dielectric layer, the first and second external electrodes include band portions which are extended onto upper and lower surfaces of the ceramic body, and a distance between inner edges of the band portions of the first and second external electrodes on the upper or lower surface of the ceramic body is defined as Lc' and a length of the dummy electrode in the length direction of the ceramic body is defined as Lp, Lc'<Lp is satisfied.

2. The multilayer ceramic electronic component of claim 1, wherein a length of the ceramic body is defined as Lc, 1.1×Lc'≤Lp<0.95×Lc is satisfied.

3. The multilayer ceramic electronic component of claim 1, wherein a distance between the floating electrode and one end surface of the ceramic body in the length direction of the ceramic body is defined as Lm and a length of one band portion of the first and second external electrodes extended onto the upper or lower surface of the ceramic body in the length direction of the ceramic body is defined as Lb, Lm<Lb is satisfied.

4. The multilayer ceramic electronic component of claim 3, wherein Lm≤0.95×Lb is satisfied.

5. The multilayer ceramic electronic component of claim 1, wherein a length of the first and second internal electrodes in the length direction of the ceramic body is defined as Lp' and a length of one band portion of the first and second external electrodes extended onto the upper or lower surface of the ceramic body in the length direction of the ceramic body is defined as Lb, Lb<Lp' is satisfied.

6. The multilayer ceramic electronic component of claim 5, wherein 1.1×Lb≤Lp' is satisfied.

7. The multilayer ceramic electronic component of claim 1, wherein a thickness of the upper or lower cover part is defined as Tc and a distance between a lowermost dummy electrode and an uppermost dummy electrode among the dummy electrodes disposed in the upper or lower cover part is defined as Td, 0.1×Tc≤Td≤0.99×Tc is satisfied.

8. A board having a multilayer ceramic electronic component, the board comprising:

a printed circuit board;

first and second board electrodes disposed on one surface of the printed circuit board; and a multilayer ceramic electronic component mounted on the printed circuit board and electrically connected to the first and second board electrodes, wherein the multilayer ceramic electronic component includes:

a ceramic body including dielectric layers;

an active part including first and second internal electrodes which are exposed to both end surfaces of the ceramic body in a length direction of the ceramic body and are stacked with at least one of the dielectric layers interposed therebetween, and floating electrodes which alternate with the first and second internal electrodes in a thickness direction of the ceramic body while allowing both end portions thereof to be spaced apart from and overlapped with the first and second internal electrodes in the thickness direction;

upper and lower cover parts disposed above and below the active part;

dummy electrodes disposed between the dielectric layers within the upper and lower cover parts; and first and second external electrodes formed on both end surfaces of the ceramic body in the length direction and electrically connected to the first and second internal electrodes, respectively, wherein an area of the floating electrode on the dielectric layer is equal to an area of the dummy electrode on the dielectric layer, the first and second external electrodes include band portions which are extended to upper and lower surfaces of the ceramic body, and a distance between inner edges of the band portions of the first and second external electrodes on the upper or lower surface of the ceramic body is defined as Lc' and a length of the dummy electrode in the length direction of the ceramic body is defined as Lp, Lc'<Lp is satisfied.

9. The board of claim 8, wherein a length of the ceramic body is defined as Lc, 1.1×Lc'≤Lp<0.95×Lc is satisfied.

10. The board of claim 8, wherein a distance between the floating electrode and one end surface of the ceramic body in the length direction of the ceramic body is defined as Lm and a length of one band portion of the first and second external electrodes extended onto the upper or lower surface of the ceramic body in the length direction of the ceramic body is defined as Lb, Lm<Lb is satisfied.

11. The board of claim 10, wherein Lm≤0.95×Lb is satisfied.

12. The board of claim 8, wherein a length of the first and second internal electrodes in the length direction of the ceramic body is defined as Lp' and a length of one band portion of the first and second external electrodes extended to the upper or lower surface of the ceramic body in the length direction of the ceramic body is defined as Lb, Lb<Lp' is satisfied.

13. The board of claim 12, wherein 1.1×Lb≤Lp' is satisfied.

14. The board of claim 8, wherein a thickness of the upper or lower cover part is defined as Tc and a distance between a lowermost dummy electrode and an uppermost dummy electrode among the dummy electrodes disposed in the upper or lower cover part is defined as Td, 0.1×Tc≤Td≤0.99×Tc is satisfied.

* * * * *